(12) United States Patent
Wang (10) Patent No.: US 10,206,227 B2
(45) Date of Patent: Feb. 12, 2019

(54) DEVICE AND METHOD OF SETTING CLEAR CHANNEL ASSESSMENT THRESHOLD

(71) Applicant: MEDIATEK INC., Hsinchu (TW)

(72) Inventor: James June-Ming Wang, San Marino, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/273,017

(22) Filed: Sep. 22, 2016

(65) Prior Publication Data

US 2017/0086226 A1     Mar. 23, 2017

Related U.S. Application Data

(60) Provisional application No. 62/221,950, filed on Sep. 22, 2015.

(51) Int. Cl.
*H04W 74/08*   (2009.01)
*H04W 24/08*   (2009.01)
*H04W 84/12*   (2009.01)

(52) U.S. Cl.
CPC ........ *H04W 74/0808* (2013.01); *H04W 84/12* (2013.01)

(58) Field of Classification Search
None
See application file for complete search history.

(56) References Cited

U.S. PATENT DOCUMENTS

2016/0095040 A1* 3/2016 Valliappan ............ H04W 16/14
                                                    370/332
2016/0157264 A1   6/2016 Wang et al.
2016/0174079 A1   6/2016 Wang et al.
2016/0249397 A1*  8/2016 Seok .................... H04W 76/023
2016/0353480 A1* 12/2016 Choi ........................ H04L 43/16
2016/0381706 A1* 12/2016 Huang .............. H04W 74/0808
                                                    370/329
2017/0311322 A1* 10/2017 Kim .................. H04W 72/0446

FOREIGN PATENT DOCUMENTS

TW        201338608 A       9/2013
TW        201352043 A      12/2013
WO    WO 2016/081181 A1     5/2016

OTHER PUBLICATIONS

Combined Office Action and Search Report dated May 7, 2018 in Taiwanese Patent Application No. 106124998 (with English language translation of categories of cited documents).

* cited by examiner

*Primary Examiner* — Eunsook Choi
(74) *Attorney, Agent, or Firm* — Oblon, McClelland, Maier & Neustadt, L.L.P.

(57) ABSTRACT

Aspects of the disclosure include a device that operates within a network service set. The device includes a transceiver configured to receive signals in a primary channel and in a secondary channel and a processing circuit. The processing circuit is configured to store a first clear channel assessment (CCA) threshold associated with signals from outside the network service set that are decodable by the device (OBSS_PD level), set a secondary channel CCA threshold to be equal to a level based on the OBSS_PD level, the secondary channel CCA threshold being associated with signals in a secondary channel, and determine whether a reception power level of a received secondary channel signal exceeds the secondary channel CCA threshold.

18 Claims, 9 Drawing Sheets

DEVICE AND METHOD OF SETTING CLEAR CHANNEL ASSESSMENT THRESHOLD

INCORPORATION BY REFERENCE

This present disclosure claims the benefit of U.S. Provisional Application No. 62/221,950, "Secondary Channel and ED CCA" filed on Sep. 22, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless data network is a network in which one device (also referred to as a station, "STA") is communicatively coupled with another STA through wireless signals. Generally, a wireless data network is implemented based on an industrial networking standard, such as the Institute of Electrical and Electronics Engineers (IEEE) 802.11 family standards, and the like. For example, IEEE 802.11ac is a wireless networking standard in the IEEE 802.11 family providing high-throughput wireless local area networks (WLANs) on the 5 GHz band.

SUMMARY

Aspects of the disclosure provide a device that operates within a network service set. The device includes a transceiver configured to receive signals in a primary channel and in a secondary channel and a processing circuit. The processing circuit is configured to store a threshold level associated with an overlapped basic service set (OBSS_PD level), the overlapped basic service set (OBSS) being configured to transmit signals from outside the network service set that are decodable by the device, set a secondary clear channel assessment (CCA) threshold to a level determined based on the OBSS_PD level, the secondary channel CCA threshold being associated with signals in a secondary channel, and determine whether a reception power level of a received secondary channel signal exceeds the secondary channel CCA threshold.

In an embodiment, the processing circuit is further configured to set the secondary channel CCA threshold equal to (or greater than) the OBSS_PD level in proportion to respective bandwidths of the primary and secondary channels.

In an embodiment, the processing circuit is further configured to determine whether a received primary channel signal from outside the network service set is decodable by the device, and determine whether a reception power level of the received primary channel signal from outside the network service set exceeds the OBSS_PD level when the received primary channel signal is determined to be decodable by the device.

Additionally, the processing circuit can be further configured to set a CCA energy-detection (CCA-ED) threshold to be a greater one of the lower limit and a reference CCA threshold associated with signals in the primary channel that are not decodable by the device, and determine whether a reception power level of a received primary channel signal exceeds the CCA-ED threshold regardless whether the received primary channel signal is decodable.

In an embodiment, when setting the secondary channel CCA threshold, the processing circuit is further configured to set the secondary channel CCA threshold to be a greater one of the level based on OBSS_PD level and a reference CCA threshold associated with the secondary channel.

Further, the secondary channel CCA threshold can be associated with signals in the secondary channel from outside the network service set if only secondary channel CCA indicates busy while primary CCA indicates idle. The processing circuit is further configured to determine whether the received secondary channel signal is from outside the network service set, and determine whether the reception power level of the received secondary channel signal exceeds the secondary channel CCA threshold when the received secondary channel signal is determined to be from outside the network service set and decodable by the device.

In an embodiment, the processing circuit is further configured to set a secondary channel CCA threshold to be a greater one of the lower limit and a reference CCA threshold associated with signals in the secondary channel that are not decodable by the device, and determine whether the reception power level of the received secondary channel signal exceeds the CCA-ED threshold regardless whether the received secondary channel signal is decodable.

Aspects of the disclosure further provide a method for a device that operates within a network service set. The method includes storing a threshold associated with an overlapped basic service set (OBSS_PD level), the overlapped basic service set (OBSS) being configured to transmit signals from outside the network service set that are decodable by the device; setting, by a processing circuit of the device, a secondary channel CCA threshold to be equal to or greater than a lower limit determined based on the OBSS_PD level, the secondary channel CCA threshold being associated with signals in a secondary channel; and determining whether a reception power level of a received secondary channel signal exceeds the secondary channel CCA threshold.

Additionally, the method can further include determining the lower limit based on the OBSS_PD level in proportion to respective bandwidths of the primary and secondary channels.

In an embodiment, setting the secondary channel CCA threshold includes setting the secondary channel CCA threshold to be a greater one of the lower limit and a reference CCA threshold associated with the secondary channel.

Aspects of the disclosure further provide a non-transitory computer readable medium storing program instructions for causing a processing circuit of a device that operates within a network service set to perform a method. The method includes storing a threshold level associated with an overlapped basic service set (OBSS_PD level), the overlapped basic service set (OBSS) being configured to transmit signals from outside the network service set that are decodable by the device, setting a secondary clear channel assessment (CCA) threshold to be equal to or greater than a lower limit determined based on the OBSS_PD level, the secondary channel CCA threshold being associated with signals in a secondary channel, and determining whether a reception power level of a received secondary channel signal exceeds the secondary channel CCA threshold.

In an embodiment, the method performed by executing the program instructions stored in the non-transitory computer readable medium further includes determining the lower limit based on the OBSS_PD level in proportion to respective bandwidths of the primary and secondary channels.

In an embodiment, setting the secondary channel CCA threshold includes setting the secondary channel CCA threshold to be a greater one of the lower limit and a reference CCA threshold associated with the secondary channel.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
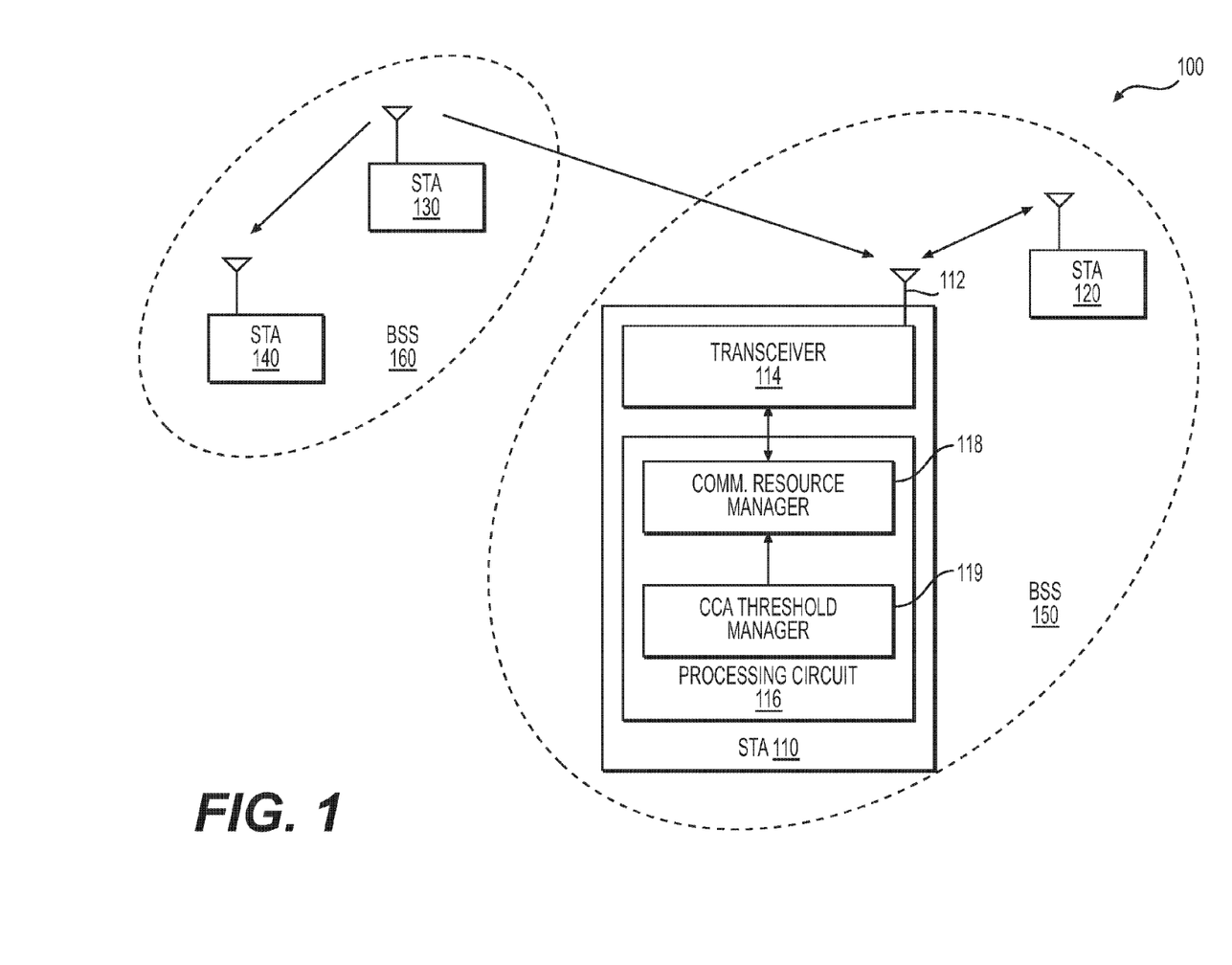
FIG. 1 shows a diagram of an exemplary wireless network according to an embodiment of the disclosure.

FIG. 1 shows a diagram of an exemplary network 100 according to an embodiment of the disclosure. The network 100 includes stations (STAs) 110, 120, 130, and 140. In some examples, at least one of the stations 110-140 is an access point station. In some examples, at least one of the stations 110-140 is a non-access point station. As shown, the stations 110 and 120 are part of, and thus operate within, a basic service set (BSS) 150. The stations 130 and 140 are part of, and thus operate within, another basic service set (BSS) 160. The stations operate within the BSS 150 and the BSS 160 are configured to use overlapped radio wave frequency bands (also referred to as shared wireless medium in the present disclosure) based on a same wireless networking standard or two compatible standards. In some applications, the BSS 150 and the BSS 160 are also referred to as overlapped basic service sets (OBSS). In at least one example, the BSS 150 and the BSS 160 operate based on an IEEE 802.11 family standard.

In accordance with the present application, the station 110 may store a threshold level associated with an OBSS (or also referred to as "OBSS_PD level"), set a secondary clear channel assessment (CCA) threshold to be equal to a level determined based on the OBSS_PD level, and determine whether a reception power level of a received secondary channel signal exceeds the secondary channel CCA threshold. As such, in some examples, when the OBSS_PD level of the station 110 is increased to have an increased chance of using the primary channel, the secondary channel CCA threshold of the station 110 can be increased accordingly in order to have an increased chance of using the secondary channel as well.

For example, in an IEEE 802.11 wireless network, allocated wireless medium are divided into communication channels. In some examples, in an IEEE 802.11 wireless network, a communication channel has a bandwidth of 20 MHz, 40 MHz, 80 MHz, or 160 MHz. Various communication channels of a less bandwidth can be combinable to be used as a single communications channel of a greater bandwidth. In an example IEEE 802.11 wireless network, a BSS is configured to use at least one communication channel, including a primary channel and, in some embodiments, one or more secondary channels.

Moreover, in an IEEE 802.11 wireless network, an enhanced distributed channel access (EDCA) protocol is used as a channel contention procedure for various stations to gain access to the shared wireless medium, e.g., to obtain a transmitting opportunity (TXOP) for transmitting radio signals onto the shared wireless medium. The EDCA protocol can include at least two stages. During the first stage of EDCA, a station obtains a TXOP for using a primary channel based on availability of the primary channel. The availability of the primary channel can be determined based on a clear channel assessment carrier-sensing (CCA-CS) scheme. Under the CCA-CS scheme, the primary channel is not available (or is determined to be "BUSY") to the station if a decodable signal in the primary channel from an OBSS is detected and the energy level thereof exceeds a clear channel assessment (CCA) threshold for the primary channel (i.e., primary channel CCA-CS threshold). In the present disclosure, the primary CCA threshold for CCA-CS scheme can also be referred to as a threshold for OBSS physical layer convergence protocol data unit (PPDU), or an OBSS_PD level. Alternatively, the availability of the primary channel can be determined based on a CCA energy-detection (CCA-ED) scheme. Under the CCA-ED scheme, the primary channel is not available to the station if a signal in the primary channel is detected and the energy level thereof exceeds a CCA threshold for the primary channel (i.e., primary channel CCA-ED threshold). Of course, an OBSS_PPDU may be transmitted in the primary channel of the current BSS or in a channel other than the primary channel of the current BSS.

A received primary channel signal may be determined as from an OBSS when the received primary channel signal exceeds a reference primary channel CCA threshold, the preamble carried by the received primary channel signal is then decoded, and the decoded data indicated that the received primary channel signal is from an OBSS. In some examples, a received signal may be determined as from an OBSS when the received signal does not exceed the reference primary channel CCA threshold and the received signal exceeds a reference secondary channel CCA threshold. In some examples, whether the reception power level of the received signal exceeds the secondary channel CCA threshold is determined when the received signal is determined to be from an OBSS, or when the received signal does not exceed the reference primary channel CCA threshold and the received signal exceeds the reference secondary channel CCA threshold. In some examples, the OBSS_PD level can be set to be greater than the reference primary channel CCA threshold. In some examples, the secondary channel CCA threshold can be set to be greater than the reference secondary channel CCA threshold.

After obtaining the TXOP for using the primary channel in the first stage, during the second stage, the EDCA protocol selects a total channel width that can be used in association with the obtained TXOP based on the availability of one or more secondary channels. In some examples, the secondary channel is not available (or is determined to be "BUSY") to the station if a decodable signal in the secondary channel from an OBSS is detected and the energy level thereof exceeds a clear channel assessment (CCA) threshold for the secondary channel (secondary channel CCA-CS threshold) under the carrier-sensing scheme. In some examples, the secondary channel is not available to the station if a signal in the secondary channel is detected and the energy level thereof exceeds a CCA threshold for the secondary channel (secondary channel CCA-ED threshold) under the energy-detection scheme.

In some examples, the primary channel CCA-CS threshold, secondary channel CCA-CS threshold, primary channel CCA-ED threshold, or secondary channel CCA-ED threshold can be adjustable in proportion to the respective bandwidths of the corresponding channels. For example, a CCA threshold ($CCA(BW_1)$) for a channel of a bandwidth $BW_1$ and a counterpart CCA threshold ($CCA(BW_2)$) for a channel of a bandwidth $BW_2$ may have a relationship whereby $CCA(BW_1)/BW_1 = CCA(BW_2)/BW_2$, where $CCA(BW_1)$ and $CCA(BW_2)$ are in milliwatts, and $BW_1$ and $BW_2$ are in MHz. Also, in at least one example, the secondary channel CCA-ED threshold is set to be the same as the primary channel CCA-ED threshold.

As shown in FIG. 1, the station 110 includes an antenna 112 coupled to a transceiver 114 that receives/transmits signals in a primary channel and in a secondary channel allocated to the BSS 150. The station 110 further includes a processing circuit 116 that determines whether the station 110 obtains a TXOP and the channel(s) that the station 110 is allowed to use associated with the TXOP. The processing circuit 116 also includes a communication resource manager 118 and a CCA threshold manager 119. The CCA threshold manager 119 functions to adjust at least a CCA level applicable to a CCA process for a secondary channel based on the primary channel CCA level. Based on the CCA thresholds provided by the CCA threshold manager 119, the communication resource manager 118 determines whether the primary and secondary channels are available.

During operation, when the station 110 is attempting to determine whether a primary channel and one or more secondary channel(s) would be available to station 110 for establishing communication with station 120 in the BSS 150, station 130 may also be simultaneously transmitting data frames to station 140 in the BSS 160. As a result, the station 150 thus also can receive signals from station 130.

The station 110 uses an increased primary channel CCA threshold to tolerate a higher level of interference and uses a decreased transmission power level to reduce an effective transmission range of the station 110. The effect of using an increased primary channel CCA threshold in conjunction with a decreased transmission power level is that the station 110 reduces a communication range in exchange of increased chance of obtaining a TXOP for using the primary channel. The CCA threshold manager 119 also adjusts the secondary channel CCA threshold based on the primary channel CCA threshold in order to evaluate the availability of the secondary channel to be used in association with the obtained TXOP based on the reduced communication range.

As a result the station 110 using an increased primary channel CCA threshold in conjunction with a decreased transmission power level, as well as an adjusted secondary channel CCA threshold, the criterion for evaluating the availability of the secondary channel are dynamically adjusted to match the criterion for evaluating the availability of the primary channel. Accordingly, the chance of using the secondary channel would not be unnecessarily falls behind the chance of obtaining the TXOP for using the primary channel.

Figure 2:
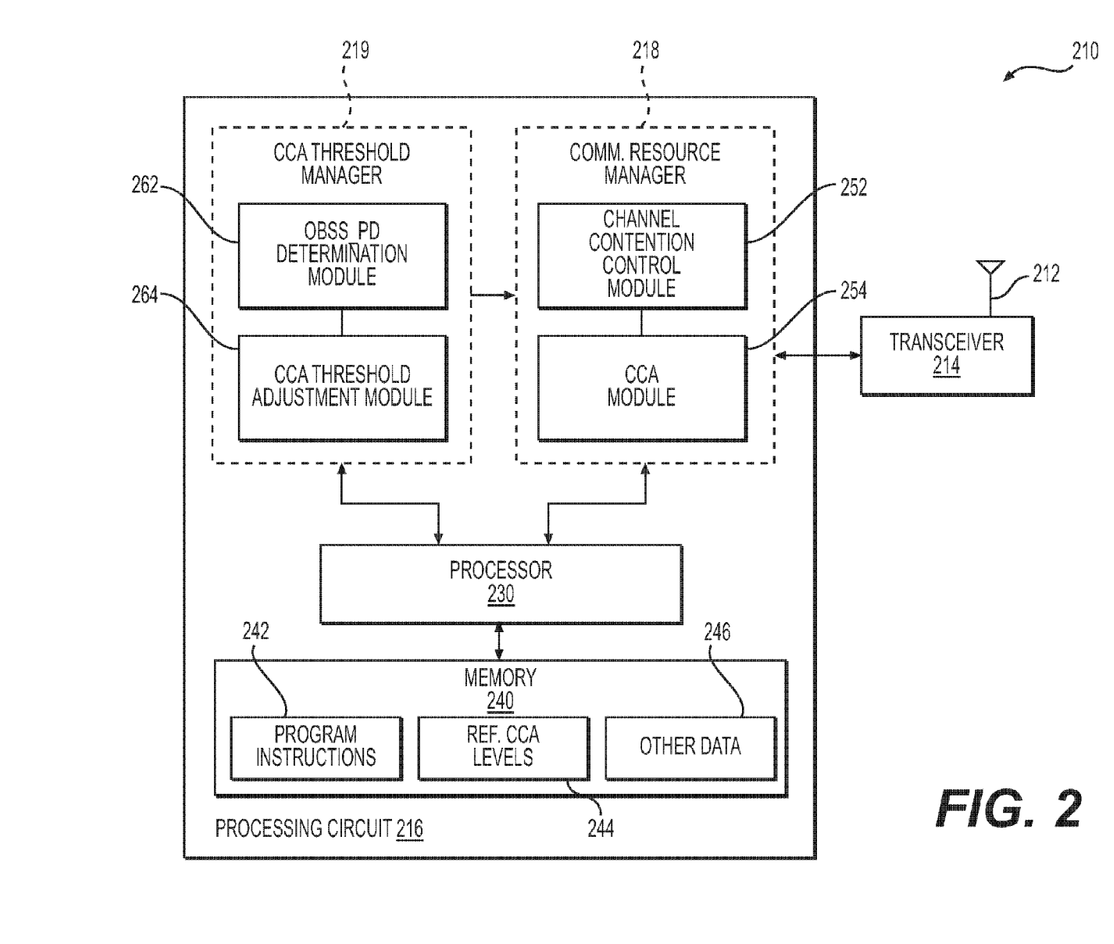
FIG. 2 shows a functional an exemplary block diagram of a station in the wireless network in FIG. 1 according to an embodiment of the disclosure.

FIG. 2 shows a more detailed exemplary functional block diagram of a station 210 according to an embodiment of the disclosure. As shown in FIG. 2, the station 210 can include an antenna 212, transceiver 214, and processing circuit 216. The processing circuit 216 includes a communication resource manager 218 and a CCA threshold manager 219. The processing circuit 216 further includes a processor 230 and a memory 240. In some examples, the processing circuit 216 further have one or more of discrete components, an integrated circuit, an application-specific integrated circuit (ASIC), and the like.

The communication resource manager 218 can include a channel contention control module 252 and a CCA module 254. The channel contention control module 252 is configured to oversee a channel contention procedure, such as a channel contention procedure according to the EDCA protocol. In response to an instruction from the channel contention control module 252, the CCA module 254 performs a CCA process based on a corresponding CCA threshold provided by the CCA threshold manager 219. In some examples, the station 210, antenna 212, transceiver 214, and processing circuit 216 correspond to the station 110, antenna 112, transceiver 114, and processing circuit 216 in FIG. 1.

During a channel contention procedure, the channel contention control module 252 works with the CCA module 254 to check the availability of a primary channel by performing a CCA process on a primary channel (also referred to as a primary channel CCA process) in order to determine whether the station 210 successfully obtains a TXOP for using the primary channel.

In some examples, the primary channel CCA process is performed based on a CCA-CS scheme, where the channel contention control module 252 first determines whether a primary channel signal received by the transceiver 214 is decodable by the station 210, and whether such decodable signal is from an OBSS. Under the CCA-CS scheme, the CCA module 254 determines whether a reception power level of the received primary channel signal exceeds a primary CCA threshold (e.g. the OBSS_PD level) for the CCA-CS scheme. If the reception power level is equal to or greater than the primary CCA threshold for CCA-CS scheme, the channel contention control module 252 determines that the primary channel is currently unavailable. In some examples, the channel contention control module 252 identifies and records a time period that the primary channel would remain unavailable based on the information extracted from the received primary channel signal. If the reception power level is less than the primary CCA threshold for CCA-CS scheme, the channel contention control module 252 determines that the primary channel is available, and thus the station 210 obtains a TXOP for using the primary channel.

The primary channel CCA process can be performed based on a CCA-ED scheme, where the channel contention control module 252 ignores whether the received primary channel signal is decodable by the station 210. Under the CCA-ED scheme, the CCA module 254 determines whether the reception power level of the received primary channel signal exceeds a primary CCA threshold for CCA-ED scheme regardless whether the received signal is decodable. If the reception power level is equal to or greater than the primary CCA threshold for CCA-ED scheme, the channel contention control module 252 determines that the primary channel is currently unavailable. The channel contention control module 252 may determine and record a random time period that the primary channel would be deemed as unavailable. If the reception power level is less than the primary CCA threshold for CCA-ED scheme, the channel contention control module 252 determines that the primary channel is available, and thus the station 210 obtains a TXOP for using the primary channel. In the present disclosure, the primary CCA threshold for CCA-ED scheme may also referred to as a primary CCA-ED level.

The primary channel CCA process can also be performed based on a combination of the CCA-CS and CCA-ED schemes. For example, the communication resource manager 218 begins with performing the primary channel CCA process on the received signal based on the CCA-CS scheme. If a primary channel signal received by the transceiver 214 is not decodable by the station 210 or decodable but not from an OBSS, the communication resource manager 218 then performs the CCA process on the received signal based on the CCA-ED scheme.

Further, during the channel contention procedure and once the channel contention control module 252 determines that the station 210 successfully obtains a TXOP for using the primary channel, the channel contention control module 252 may determine whether to expand the communication capacity in association with the TXOP by using one or more secondary channels together with the primary channel. Accordingly, to check the availability of a secondary channel, the channel contention control module 252 works with the CCA module 254 to perform another CCA process on the secondary channel (also referred to as a secondary channel CCA process).

In some examples, the secondary channel CCA process is performed based on a CCA-CS scheme using a secondary channel CCA threshold for CCA-CS scheme in a manner similar to the CCA-CS scheme illustrated above for the primary channel CCA process. Under the CCA-CS scheme, the CCA module 254 determines whether a reception power level of the received second channel signal exceeds the secondary channel CCA threshold for CCA-CS scheme when the received secondary channel signal is determined to be from an OBSS and decodable by the station 210. If the reception power level is equal to or greater than the secondary channel CCA threshold for CCA-CS scheme, the channel contention control module 252 determines that the secondary channel is currently unavailable. If the reception power level is less than the secondary channel CCA threshold for CCA-CS scheme, the channel contention control module 252 determines that the secondary channel is available. In the present disclosure, the secondary channel CCA threshold for CCA-CS scheme may also be referred to as a secondary channel CCA-CS level.

In some other examples, the secondary channel CCA process can be performed based on a CCA-ED scheme using a secondary channel CCA threshold for CCA-ED scheme in a manner similar to the CCA-ED scheme illustrated above for the secondary channel CCA process. Under the CCA-ED scheme, the CCA module 254 determines whether the reception power level of the received secondary channel signal exceeds the secondary channel CCA threshold for CCA-ED scheme regardless whether the received signal is decodable. If the reception power level is equal to or greater than the secondary channel CCA threshold for CCA-ED scheme, the channel contention control module 252 determines that the secondary channel is currently unavailable. If the reception power level is less than the secondary channel CCA threshold for CCA-ED scheme, the channel contention control module 252 determines that the secondary channel is available. In the present disclosure, the secondary channel CCA threshold for CCA-ED scheme may also be referred to as a secondary channel CCA-ED level.

In yet another example, the secondary channel CCA process can be performed based on a combination of the CCA-CS and CCA-ED schemes in a manner similar to the combined CCA scheme illustrated above for the primary channel CCA process. For example, the communication resource manager 218 begins with performing the secondary channel CCA process on the received secondary channel signal based on the CCA-CS scheme. If the received secondary channel signal is not decodable by the station 210 or not from an OBSS, the communication resource manager 218 then performs the secondary channel CCA process on the received secondary channel signal based on the CCA-ED scheme.

The CCA threshold manager 219 includes an OBSS_PD determination module 262 and a CCA threshold adjustment module 264. The OBSS_PD determination module 262 determines an OBSS_PD level applicable to a current channel contention procedure. The CCA threshold adjustment module 264 adjusts one or more of the primary CCA-ED level, secondary channel CCA-CS level, and secondary CCS-ED level based on the OBSS_PD level.

In some examples, the OBSS_PD determination module 262 can determine the OBSS_PD level based on a transmission power level to be used by the transceiver 214 when the TXOP is obtained. The OBSS_PD determination module 262 may receive the OBSS_PD level set by another station in a same BSS, such as an access point station in the BSS 150. In some examples, the OBSS_PD determination module 262 may negotiate the OBSS_PD level with another station in a same BSS or another station in an OBSS.

In at least one example, before the channel contention control module 252 initiates a channel contention procedure, the station 210 determines the transmission power level. In some examples, the transmission power level is determined based on monitoring activities on the communication channels allocated to the corresponding BSS, communication history of the station 210 within the BSS, and/or a selected modulation and coding scheme (MCS) to be used by the transceiver 214 when the TXOP is obtained, or the like.

As shown in FIG. 2, the CCA threshold adjustment module 264 adjusts one or more of the primary CCA-ED level, secondary channel CCA-CS level, and secondary CCS-ED level based on the OBSS_PD level. The station 210 can store respective reference CCA levels for the primary CCA-ED level, secondary channel CCA-CS level, and/or secondary CCS-ED level as baseline threshold values or default threshold values. The reference CCA threshold levels may be defined, or calculated based on equations provided, by a predetermined communicating standard, such as a communication standard from the IEEE 802.11 family standards. Also, the CCA threshold adjustment module 264 sets a lower limit for the corresponding CCA threshold based on the OBSS_PD level. In some examples, the CCA threshold adjustment module 264 sets the primary CCA-ED level, secondary channel CCA-CS level, or secondary CCS-ED level to be a greater one of the lower limit and a corresponding reference CCA threshold.

The lower limit may be a fixed value regardless the bandwidth of the corresponding communication channels. Alternatively, the lower limit may be adjustable in proportion to applicable bandwidths. In such examples, the CCA threshold adjustment module 264 adjusts the lower limit in proportion to respective bandwidths of the primary and the secondary channels. For example, given the OBSS_PD level (OBSS_PD(BW$_1$)) for a primary channel of bandwidth BW$_1$, the lower limit (LL(BW$_2$)) for a secondary channel of bandwidth BW$_2$ can be determined based on the equation:

$$LL(BW_2) = OBSS\_PD + 10 \times \log(BW_2/BW_1) \quad (a).$$

OBSS_PD(BW$_1$) and LL(BW$_2$) are in decibel-milliwatt (dBm).

Moreover, as shown in FIG. 2, the processor 230 is electrically coupled with the memory 240 and configured to execute program instructions 242 stored in the memory 240 to perform various functions. Various modules described in the present disclosure store or retrieve data in the memory 240 through the processor 230. The processor 230 can include a single or multiple processing cores. In some examples, the processor 230 executes the program instructions to function as one or more of the channel contention control module 252, CCA module 254, OBSS_PD determination module 262, and CCA threshold adjustment module 264. Of course, in some examples, one or more of the channel contention control module 252, CCA module 254, OBSS_PD determination module 262, and CCA threshold adjustment module 264 described in the present disclosure are implemented as circuitry.

The memory 240 is used to store the program instructions 242, one or more reference CCA levels 244, and/or other data, intermediate data, or received or calculated CCA levels 246. In some examples, the memory 240 includes a non-transitory computer readable medium, such as a semiconductor or solid-state memory, a random access memory (RAM), a read-only memory (ROM), a hard disk, an optical disk, or other suitable storage medium. In some embodiments, the memory 240 includes a combination of two or more of the non-transitory computer readable mediums listed above.

Figure 3:
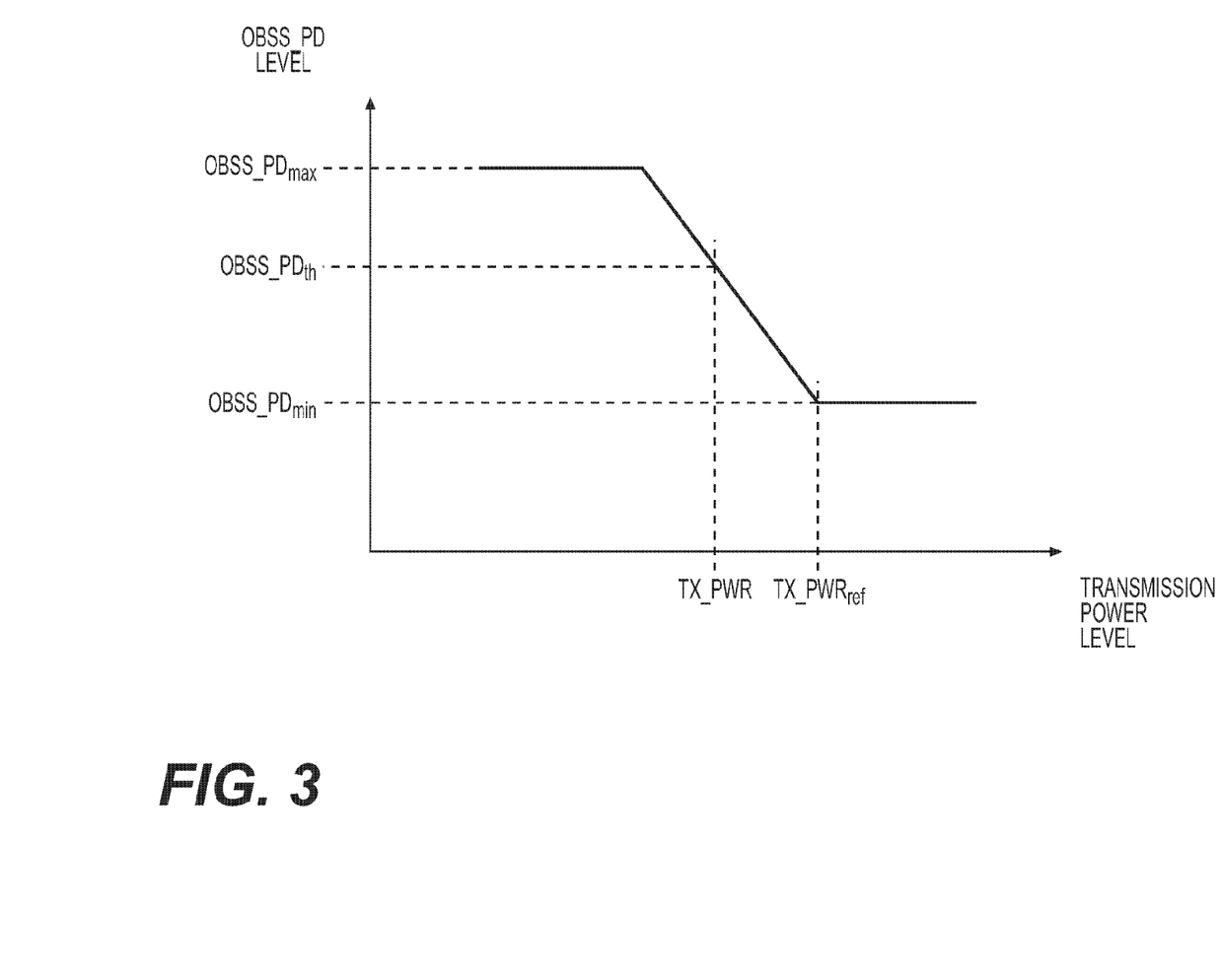
FIG. 3 shows a chart illustrating an example of determining a CCA threshold based on a transmission power level of the station in FIG. 2 according to an embodiment of the disclosure.

FIG. 3 shows a chart illustrating an example of determining a primary CCA-CS threshold (i.e., the OBSS_PD level) by a the OBSS_PD determination module, such as by the OBSS_PD determination module 262 based on a transmission power level of the station 210 in FIG. 2 according to an embodiment of the disclosure. Of course, in other examples, the OBSS_PD level can be determined using a different equation or a look-up table based on the transmission power level.

In the example illustrated in FIG. 3, the OBSS_PD level is determined based on the equation:

$$OBSS\_PD_{th} = \max\left[\min\left(\begin{array}{c} OBSS\_PD_{min} \\ OBSS\_PD_{max} \\ OBSS\_PD_{min} + (TX\_PWR_{ref} - TX\_PWR) \end{array}\right)\right]. \quad (b)$$

OBSS_PD$_{th}$ represents the calculated OBSS_PD level; OBSS_PD$_{max}$ represents a maximum value for the OBSS_PD level; OBSS_PD$_{mix}$ represents a minimum value for the OBSS_PD level; and TX_PWR$_{ref}$ is a predetermined reference power level. All values in equation (b) are in decibel-milliwatt (dBm). In some examples, TX_PWR$_{ref}$ is set to be at 23 dBm.

OBSS_PD$_{max}$ and OBSS_PD$_{mix}$ may be fixed values regardless the bandwidth of the corresponding communication channels. Alternatively, OBSS_PD$_{max}$ and OBSS_PD$_{mix}$ may be adjustable in proportion to respective applicable bandwidths. For example, given the OBSS_PD$_{max}$ for a communication channel of bandwidth BW$_1$, the OBSS_PD$_{max}$ for a communication channel of bandwidth BW$_2$ can be determined based on the equation:

$$OBSS\_PD_{max}(BW_2) = OBSS\_PD_{max}(BW_1) + 10 \times \log(BW_2/BW_1) \quad (c).$$

Similarly, in an example, given the OBSS_PD$_{min}$ for a communication channel of bandwidth BW$_1$, the OBSS_PD$_{min}$ for a communication channel of bandwidth BW$_2$ can be determined based on the equation:

$$OBSS\_PD_{min}(BW_2) = OBSS\_PD_{min}(BW_1) + 10 \times \log(BW_2/BW_1) \quad (d).$$

In addition, further illustration with respect to the effects of adjusting the secondary channel CCA-CS level or secondary CCS-ED level by a CCA threshold adjustment module, such as the CCA threshold adjustment module 264 in FIG. 2, is illustrated with reference to FIGS. 4A-4D.

Figure 4A:
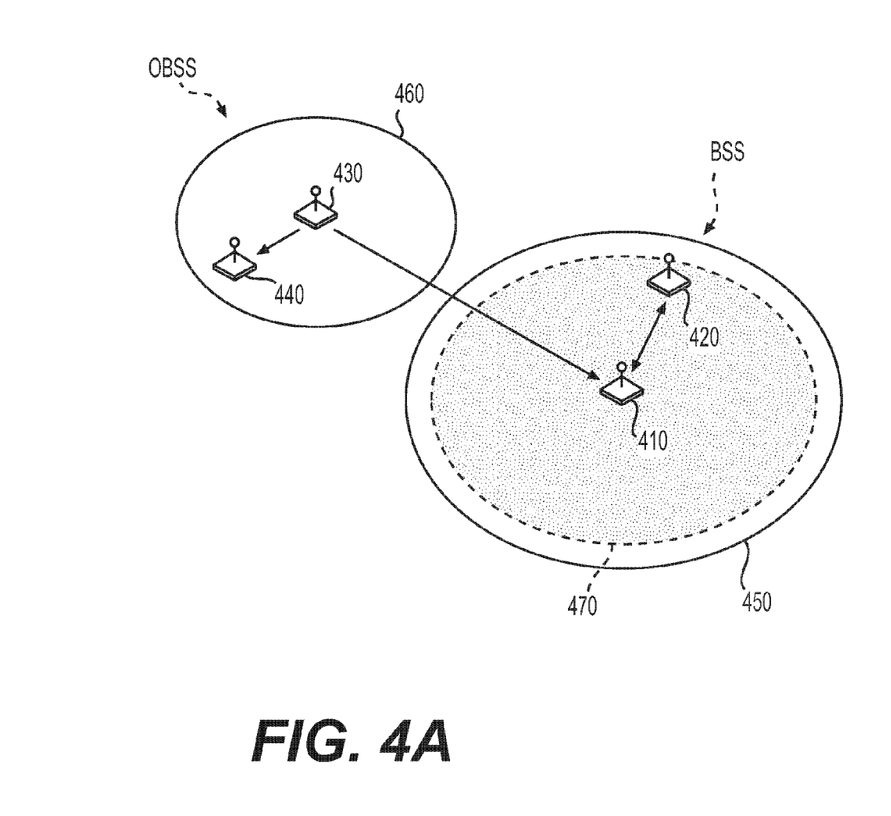
FIG. 4A shows a diagram illustrating an exemplary scenario, including plural stations and corresponding interfering or interference sensing ranges thereof, according to an embodiment of the disclosure.
Figure 4B:
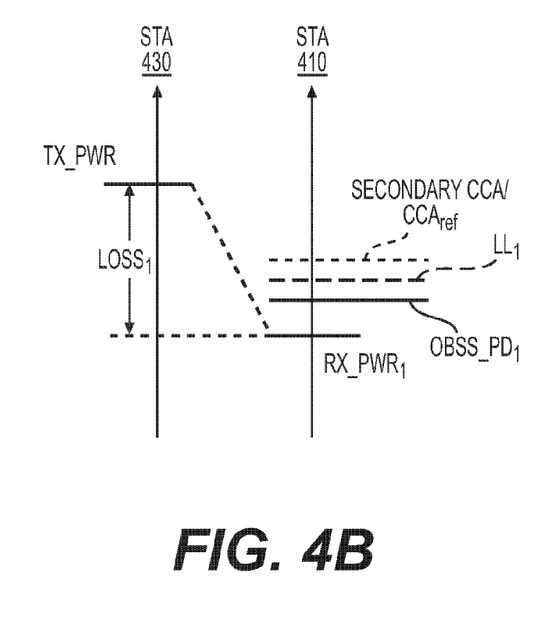
FIG. 4B shows various power levels and thresholds in the exemplary scenario of FIG. 4A according to an embodiment of the disclosure.

FIG. 4A illustrates an exemplary scenario according to an embodiment of the disclosure. The scenario includes plural stations 410-440, as well as respective interfering or interference sensing ranges. FIG. 4B shows various power levels and thresholds of the stations 410 and 430 in the example scenario of FIG. 4A. The stations 410-440 can correspond to stations 110-140 in FIG. 1, respectively. Stations 410 and 420 belong to a BSS, while stations 430 and 440 belong to another BSS, which is an OBSS to the stations 410 and 420.

As illustrated in FIGS. 4A and 4B, in order to communicate with the station 440, the station 430 may transmit a signal at a transmission power level TX_PWR. The station 410 can receive the signal from the station 430 at a reception power level RX_PWR$_1$. The difference between the transmission power level TX_PWR and the reception power level RX_PWR$_1$ corresponds to a transmission loss (labeled as "LOSS$_1$") between the station 430 and the station 410. Moreover, in order to communicate with the station 420, the station 410 may initiate a channel contention procedure, which includes determining whether the station 410 successfully obtain a TXOP based on an OBSS_PD level (labeled as "OBSS_PD$_1$") and determining whether a secondary channel would be available for communication in association with the obtained TXOP based on an secondary channel CCA level (either a CCA-CS level or CCA-ED level). In at least one example, the secondary channel CCA level may be set to be equal to a reference CCA threshold (labeled as "CCA$_{ref}$").

According to the settings of the stations 410 and 430, the OBSS_PD level OBSS_PD$_1$ may be visualized as an interference sensing range 450, where a corresponding channel is deemed to be unavailable when a wireless signal having a power level sufficient to cause interference is detected within the interference sensing range 450. Also, the transmission power level TX_PWR may be visualized as an interfering range 460 in which the wireless signal in the interfering range 460 has a power level sufficient to cause interference. The interference sensing range 450 expands when the OBSS_PD level decreases; and the interference sensing range 450 reduces when the OBSS_PD level increases. Also, the interfering range 460 expands when the transmission power level TX_PWR increases; and the interfering range 460 reduces when the transmission power level TX_PWR decreases. When the reception power level $RX\_PWR_1$ is equal to the OBSS_PD level $OBSS\_PD_1$, the boundaries of the ranges 450 and 460 are in contact with each other.

As illustrated in FIGS. 4A and 4B, because the reception power level $RX\_PWR_1$ is less than the OBSS_PD level $OBSS\_PD_1$, the ranges 450 and 460 do not overlap and the station 410 determines that the primary channel is available to the station 410.

Similarly, the secondary channel CCA level corresponds to an interference sensing range 470. In this example, the secondary channel CCA level is set to be equal to a CCA reference level $CCA_{ref}$, which is greater than a lower limit $LL_1$ that can be determined based on the OBSS_PD level $OBSS\_PD_1$. Because the reception power level $RX\_PWR_1$ is less than the secondary channel CCA level, the ranges 470 and 460 do not overlap and the station 410 determines that the secondary channel is also available to the station 410.

Figure 4C:
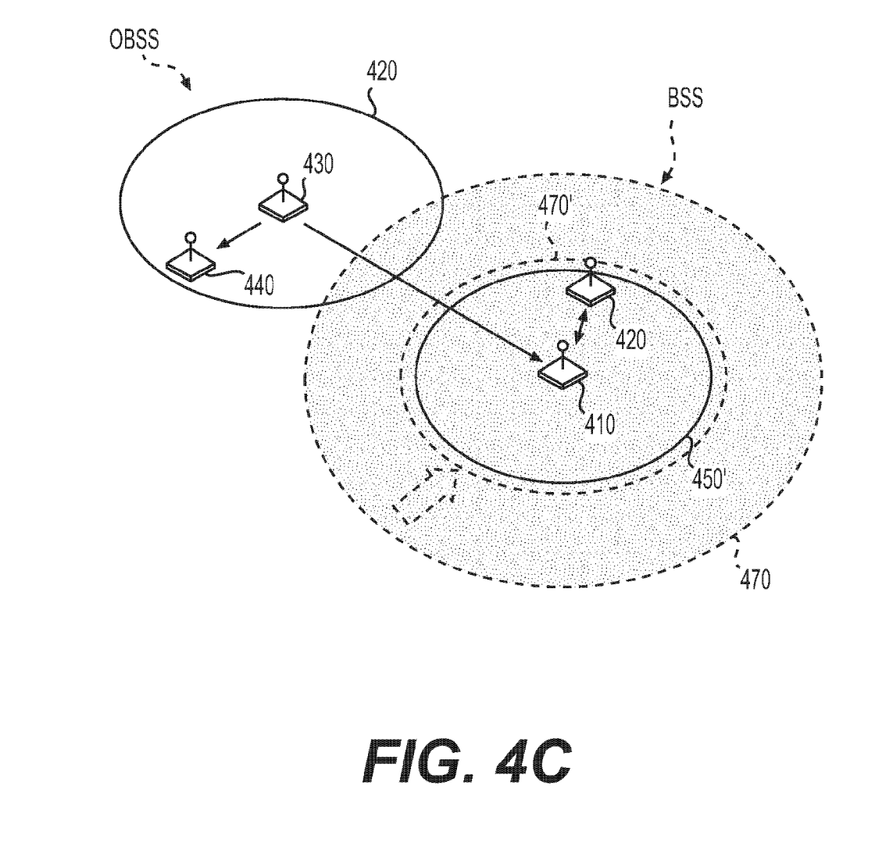
FIG. 4C shows a diagram illustrating another exemplary scenario, including plural stations and corresponding interfering or interference sensing ranges thereof, according to an embodiment of the disclosure.
Figure 4D:
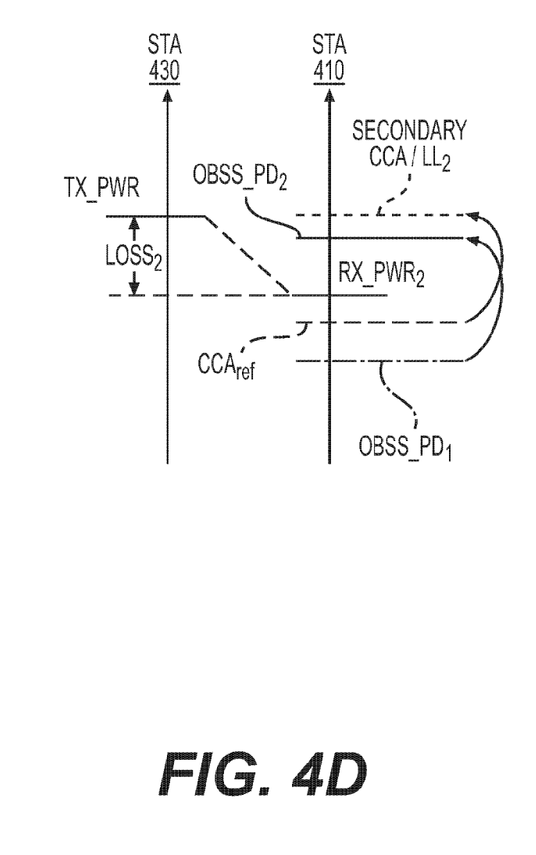
FIG. 4D shows various power levels and thresholds in the exemplary scenario of FIG. 4C according to an embodiment of the disclosure.

FIG. 4C illustrates another exemplary scenario according to an embodiment of the disclosure. The scenario includes plural stations 410-440, as well as respective interfering or sensing ranges. FIG. 4D shows various power levels and thresholds of the stations 410 and 430 in the example scenario of FIG. 4C. Components in FIGS. 4C and 4D that are the same or similar to the components in FIG. 4A and FIG. 4B are given the same reference numbers, and detailed description thereof is thus omitted.

As illustrated in FIGS. 4C and 4D, in order to communicate with the station 440, the station 430 may transmit a signal at a transmission power level TX_PWR. The station 410 can receive the signal from the station 430 at a reception power level $RX\_PWR_2$. The difference between the transmission power level TX_PWR and the reception power level $RX\_PWR_2$ corresponds to a transmission loss (labeled as "$LOSS_2$") between the station 430 and the station 410. Moreover, in order to communicate with the station 420, the station 410 may initiate a channel contention procedure, which includes determining whether the station 410 successfully obtain a TXOP based on an OBSS_PD level (labeled as "$OBSS\_PD_2$") and determining whether a secondary channel would be available for use in association with the obtained TXOP based on an secondary channel CCA level (either a CCA-CS level or CCA-ED level). In this example, the secondary channel CCA level may be set to a lower limit ($LL_2$) that can determined based on the OBSS_PD level $OBSS\_PD_2$. In this example, the secondary channel CCA level is greater than a CCA reference level $CCA_{ref}$.

According to the settings of the stations 410 and 430, the OBSS_PD level $OBSS\_PD_2$ corresponds to an interference sensing range 450'. Also, the transmission power level TX_PWR corresponds to an interfering range 460. Compared with the scenario illustrated with reference to FIGS. 4A and 4B, the OBSS_PD level has been increased from $OBSS\_PD_1$ to $OBSS\_PD_2$ in order to avoid interferences caused by the station 430. As a result, the station 410 is configured to have a shorter primary channel communication range in exchange for increased chances of obtaining a TXOP despite the signals from the station 430.

As illustrated in FIGS. 4C and 4D, because the reception power level $RX\_PWR_2$ is less than the OBSS_PD level $OBSS\_PD_2$, the ranges 450' and 460 do not overlap and the station 110 determines that the primary channel is available to the station 110.

In this example, the secondary channel CCA level may be set to the lower limit ($LL_2$), which is greater than the reference CCA threshold $CCA_{ref}$. As illustrated in FIG. 4C, the secondary channel CCA level corresponds to an interference sensing range 470'. Because the reception power level $RX\_PWR_2$ is less than the secondary channel CCA level, the ranges 470' and 460 do not overlap and the station 410 determines that the secondary channel is also available to the station 410.

In contrast, in an alternative example, the secondary channel CCA level is set to the reference CCA threshold $CCA_{ref}$, which corresponds to an interference sensing range 470. In such example, the power level $RX\_PWR_2$ may be greater than the reference CCA threshold $CCA_{ref}$. As such, in this alternative example, the interference sensing range 470 for the secondary channel is much larger than the interference sensing range 460 for the primary channel. Therefore, even though the configuration for using the primary channel has been adjusted to implement a smaller communication range, the ranges 460 and 470 may still overlap and the station 410 would determine that the secondary channel is unavailable to the station 410. Accordingly, the criterion for determining the availability of the secondary channel is unnecessarily more stringent than the criterion for determining the availability of the primary channel. As a result, adjust the secondary channel CCA level based on the primary CCA level can avoid unnecessarily depriving the chance of using the secondary channel after obtaining the TXOP for using the primary channel.

Figure 5:
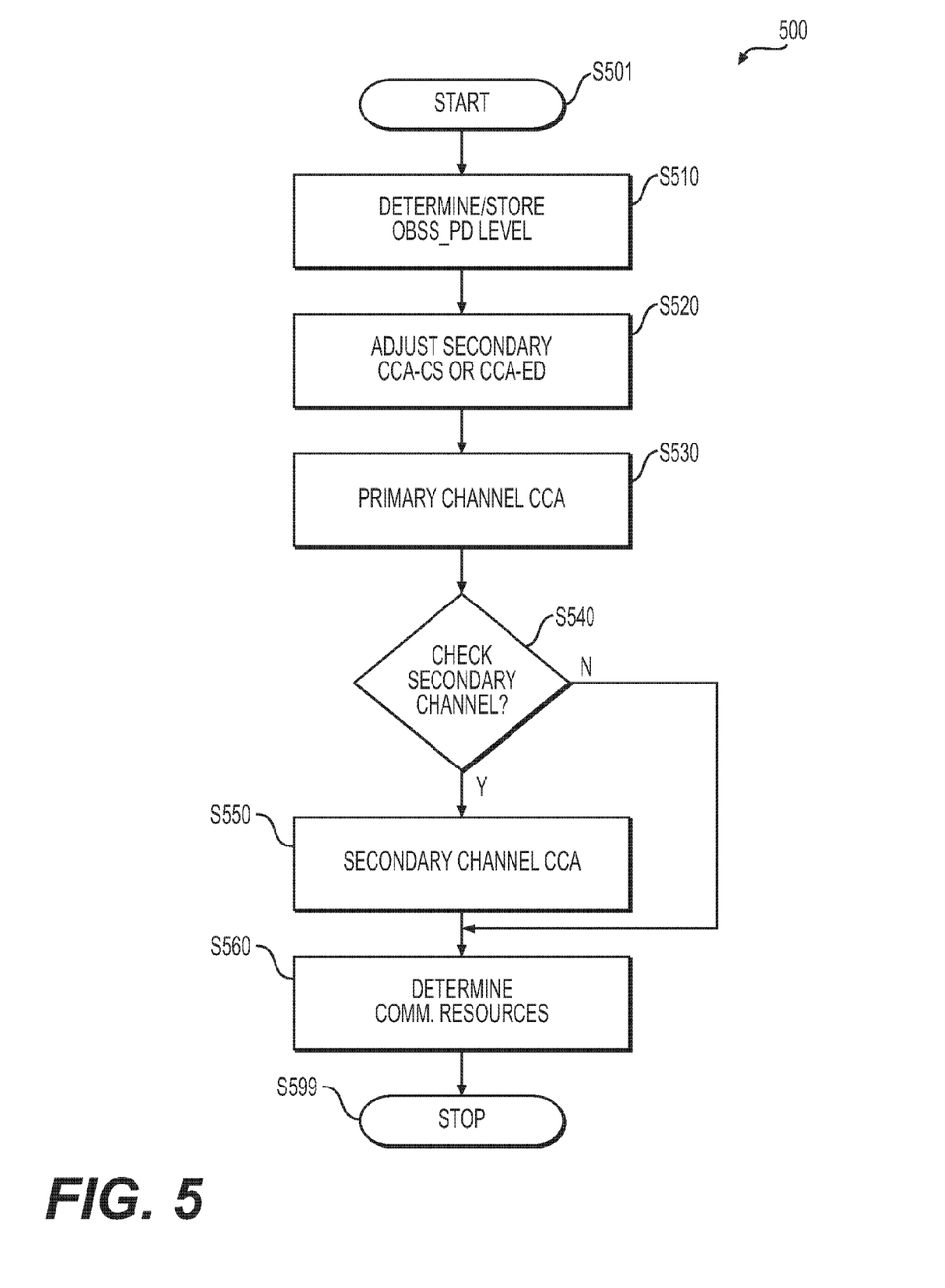
FIG. 5 shows a flow chart outlining an exemplary process of operating a station, such as the station in FIG. 2, according to an embodiment of the disclosure.

FIG. 5 shows a flow chart outlining an exemplary process 500 of operating a station, such as the station 210 in FIG. 2, according to an embodiment of the disclosure. It is understood that additional operations may be performed before, during, and/or after the process 500 depicted in FIG. 5. The process 500 starts at S501 and proceeds to S510.

At S510, an OBSS_PD level associated with a primary channel is determined and/or stored. The OBSS_PD level may be determined based on a predetermined transmission power level. In some examples, the OBSS_PD level may be a pre-determined value or can be received from another station, and the determination process is omitted. In some examples, the OBSS_PD level may be updated once every few minutes or longer or when a change of the configuration of the corresponding BSS is detected. For example, the OBSS_PD determination module 262 determines an OBSS_PD level associated with a primary channel as illustrated with reference to FIGS. 2 and 3.

At S520, one or more of the primary CCA-ED level, secondary channel CCA-CS level, and secondary CCS-ED level is adjusted based on the OBSS_PD level. In some examples, the primary CCA-ED level, secondary channel CCA-CS level, and secondary CCS-ED level may correspond to different reference CCA thresholds. The primary CCA-ED level, secondary channel CCA-CS level, or secondary CCS-ED level can be set to be a greater one of the corresponding reference CCA threshold and a lower limit determined based on the OBSS_PD level. In some examples, the lower limit may be calculated based on the OBSS_PD level in proportion to respective bandwidths of the primary and the secondary channels. For example, the CCA threshold adjustment module 264 adjusts one or more of the primary CCA-ED level, secondary channel CCA-CS level, and secondary CCS-ED level as illustrated with reference to FIGS. 2 and 4A-4D.

At S530, a primary channel CCA process is performed in order to determine whether the primary channel is available. The primary channel CCA process can be performed based on a CCA-CS scheme using the OBSS_PD level. The primary channel CCA process can be performed based on a CCA-ED scheme using the primary CCA-ED level. In at least one other example, the primary channel CCA process can be performed based on a combination of the CCA-CS and CCA-ED schemes using the OBSS_PD level and the primary CCA-ED level. For example, the CCA module 254 performs the primary channel CCA process as illustrated with reference to FIG. 2.

At S540, whether to check the availability of a secondary channel is determined. In some examples, when a result of the primary channel CCA process indicates that the primary channel is unavailable, there may be no need to check the availability of a secondary channel at this stage. In some examples, even a result of the primary channel CCA process indicates that the primary channel is available, when the primary channel or the selected modulation and coding scheme renders the usage of any secondary channel infeasible, it may be determined that there is no need to check the availability of a secondary channel at this stage. The channel contention control module 252 can be used to determine whether to check the availability of the secondary channel based on the result of S530.

At S540, when it is determined to check the availability of the secondary channel, the process proceeds to S550. When it is determined not to check the availability of the secondary channel, the process proceeds to S560.

At S550, a secondary channel CCA process is performed in order to determine whether the secondary channel is available. The secondary channel CCA process can be performed based on a CCA-CS scheme using the secondary channel CCA-CS level. The secondary channel CCA process can be performed based on a CCA-ED scheme using the secondary channel CCA-ED level. In at least one other example, the secondary channel CCA process can be performed based on a combination of the CCA-CS and CCA-ED schemes using the secondary channel CCA-CS level and the secondary channel CCA-ED level. For example, the CCA module 254 performs the secondary channel CCA process as illustrated with reference to FIG. 2.

At S560, which communication resources are currently available is determined. S560 may include determining whether the station successfully obtains a TXOP for using the primary channel. When the TXOP for using the primary channel is obtained, whether one or more secondary channels are available to be used together with the primary channel in association with the TXOP may be further determined. For example, the channel contention control module 252 determines which communication resources that are currently available to the station 110, including whether a TXOP for using the primary channel is obtained and whether one or more secondary channels are to be used together with the primary channel as illustrated with reference to FIG. 2.

After S560, the process 500 proceeds to S599 and terminates.

Figure 6:
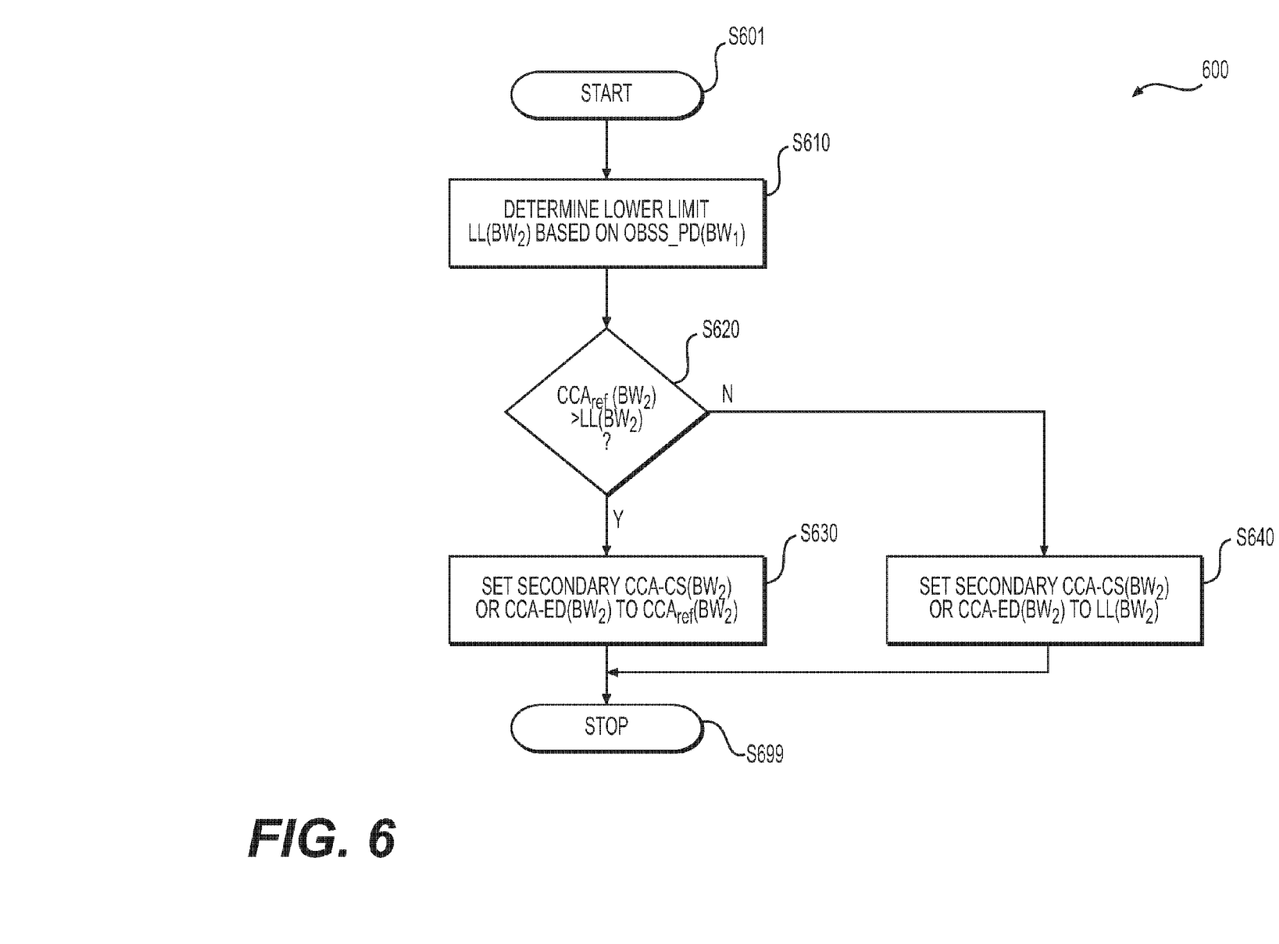
FIG. 6 shows a flow chart outlining an exemplary process of determining a CCA threshold usable in a process, such as the process in FIG. 5, according to an embodiment of the disclosure.

FIG. 6 shows a flow chart outlining an exemplary process 600 of determining a CCA threshold associated with a secondary channel usable in a process, such as the process 500 in FIG. 5, according to an embodiment of the disclosure. In some examples, process 600 corresponds to at least a portion of S520 in FIG. 5. In some examples, process 600 is performed by the CCA threshold adjustment module 264 as illustrated above with reference to FIG. 2. It is understood that additional operations may be performed before, during, and/or after the process 600 depicted in FIG. 6. The process 600 starts at S601 and proceeds to S610.

At S610, a lower limit for a secondary channel of a bandwidth $BW_2$ (also referred to as "$LL(BW_2)$") is determined based on an OBSS_PD level for a primary channel of a bandwidth $BW_1$ (also referred to as "OBSS_PD $(BW_1)$"). The lower limit $LL(BW_2)$ may be determined based on the aforementioned equation (a).

At S620, whether a reference CCA level for the secondary channel (also referred to as "$CCA_{ref}(BW_2)$") is greater than the lower limit $LL(BW_2)$ is determined. When $CCA_{ref}(BW_2)$ is greater than $LL(BW_2)$, the process proceeds to S630; when $CCA_{ref}(BW_2)$ is equal to or less than $LL(BW_2)$, the process proceeds to S640.

At S630, the $CCA_{ref}(BW_2)$ is set to be used as the secondary channel CCA-CS level or the secondary channel CCA-ED level for the secondary channel.

At S640, the $LL(BW_2)$ is set to be used as the secondary channel CCA-CS level or the secondary channel CCA-ED level for the secondary channel.

After S630 or S640, the process 600 proceeds to S699 and terminates.

Figure 7A:
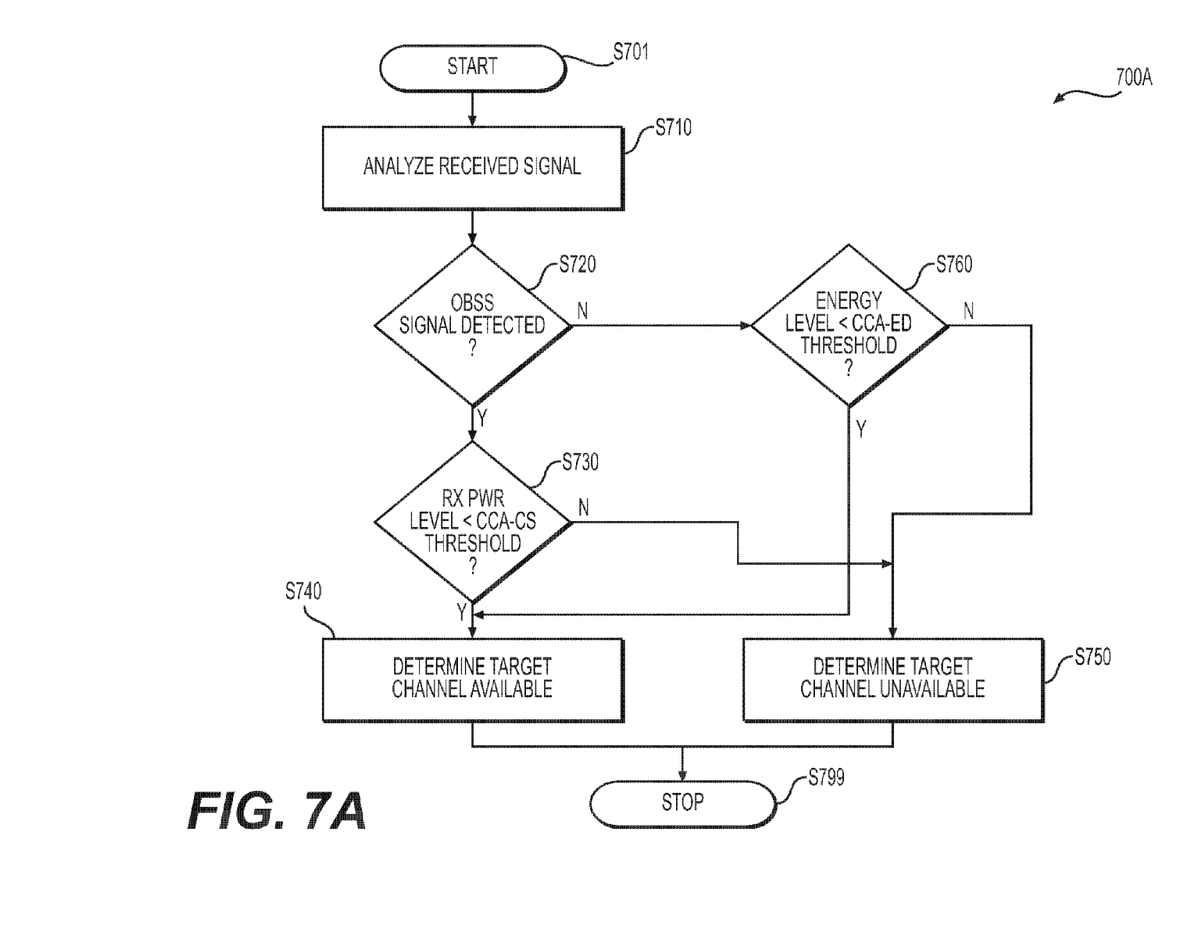
FIG. 7A shows a flow chart outlining an exemplary process of performing a CCA process usable in a process, such as the process in FIG. 5, according to an embodiment of the disclosure.

FIG. 7A shows a flow chart outlining an exemplary process 700A of performing a CCA process usable in a process, such as S530 or S550 in the process 500 in FIG. 5, according to an embodiment of the disclosure. In some examples, process 700A is performed by the channel contention control module 252 and/or the CCA module 254 as illustrated above with reference to FIG. 2. It is understood that additional operations may be performed before, during, and/or after the process 700A depicted in FIG. 7A. The process 700A starts at S701 and proceeds to S710.

At S710, a received signal in a corresponding target channel, such as a primary channel or a secondary channel, is analyzed in order to determine whether the received signal is decodable according to a predetermined communicating standard and whether the decodable signal is from a station belongs to an OBSS is determined. In some examples, a decoding attempt based on the predetermined communicating standard may be performed on the received signals. When a resulting decoded data preamble or an entire data frame is consistent with the predetermined communicating standard, the received signal can be deemed decodable. Whether the decoded data preamble or data frame is from an OBSS may be determined by checking an indicator provided in the decoded data preamble or data frame, or by elimination process based on a communication history of the current BSS, or the like.

At S720, when the received signal is a decodable OBSS signal, the process proceeds to S730. When the received signal is not decodable or not from an OBSS, the process proceeds to S760.

At S730, whether a reception power level of the received signal is greater than a corresponding CCA-CS level is determined. When the reception power level is less than the CCA-CS level, the process proceeds to S740, where the target channel is determined to be available. When the reception power level is equal to or greater than the CCA-CS level, the process proceeds to S750, where the target channel is determined to be unavailable.

At S760, whether a reception power level of the received signal is greater than a corresponding CCA-ED level is determined. When the reception power level is less than the CCA-ED level, the process proceeds to S740, where the target channel is determined to be available. When the reception power level is equal to or greater than the CCA-ED level, the process proceeds to S750, where the target channel is determined to be unavailable.

After S740 or S750, the process 700A proceeds to S799 and terminates.

The process 700A shows a CCA process performed based on a combined CCA-CS and CCA-ED scheme as illustrated with reference to FIG. 2. In some examples, when the process 700A is performed based on the CCA-CS scheme, S760 may be omitted, and the process proceeds from S720 to S750 when the received signal is not decodable or not from an OBSS.

Figure 7B:
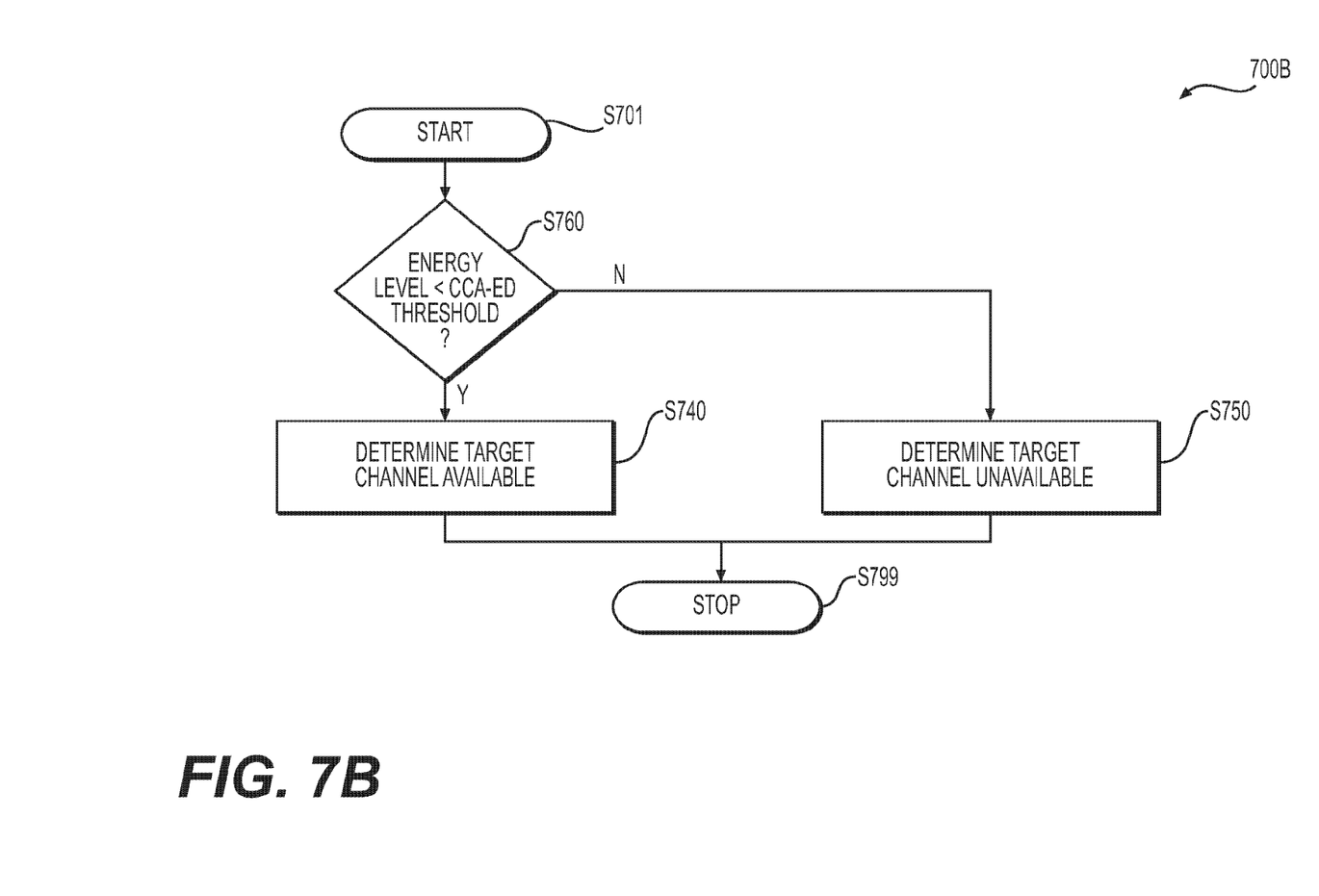
FIG. 7B shows a flow chart outlining another exemplary process of performing a CCA process usable in a process, such as the process in FIG. 5, according to an embodiment of the disclosure.

FIG. 7B shows a flow chart outlining another exemplary process 700B of performing a CCA process usable in a process, such as S530 or S550 in the process 500 in FIG. 5, according to an embodiment of the disclosure. Components in FIG. 7B that are the same or similar to the components in FIG. 7A are given the same reference number, and detailed description thereof is thus omitted. In some examples, process 700B is performed by the channel contention control module 252 and/or the CCA module 254 as illustrated above with reference to FIG. 2. It is understood that additional operations may be performed before, during, and/or after the process 700B depicted in FIG. 7B.

Compared with the process 700A, S710-S730 can be omitted in process 700B. Accordingly, the process 700B starts at S701 and proceeds to S760.

At S760, whether a reception power level of the received signal is greater than a corresponding CCA-ED level is determined. When the reception power level is less than the CCA-ED level, the process proceeds to S740, where the target channel is determined to be available. When the reception power level is equal to or greater than the CCA-ED level, the process proceeds to S750, where the target channel is determined to be unavailable.

After S740 or S750, the process 700B proceeds to S799 and terminates.

While aspects of the present disclosure have been described in conjunction with the specific embodiments thereof that are proposed as examples, alternatives, modifications, and variations to the examples may be made. For example, although the embodiments described herein are based on WLAN or IEEE 802.11 standards, other embodiments may be implemented based on other communicating standards, such as Long-Term Evolution (LTE), LTE in unlicensed spectrum (LTE-U), LTE-License Assisted Access (LTE-LAA), LTE-WLAN integration (LWIP), or the like. Accordingly, embodiments as set forth herein are intended to be illustrative and not limiting. There are changes that may be made without departing from the scope of the claims set forth below.

What is claimed is:

1. A device that operates within a network service set, comprising:
    a transceiver configured to receive signals in a primary channel and in a secondary channel; and
    a processing circuit configured to:
        store a threshold level associated with an overlapped basic service set (OBSS_PD level), the overlapped basic service set (OBSS) being configured to transmit signals from outside the network service set that are decodable by the device,
        set a secondary channel clear channel assessment (CCA) threshold to be a greater one of a default secondary channel CCA threshold and the OBSS_PD level,
        determine whether a received primary channel signal from outside the network service set is decodable by the device,
        determine whether a reception power level of the received primary channel signal from outside the network service set exceeds the OBSS_PD level when the received primary channel signal is determined to be decodable by the device, and
        determine whether a reception power level of a received secondary channel signal exceeds the secondary channel CCA threshold.

2. The device of claim 1, wherein the processing circuit is further configured to:
    determine the secondary channel CCA threshold based on the OBSS_PD level in proportion to respective bandwidths of the primary and secondary channels.

3. The device of claim 1, wherein the processing circuit is further configured to:
    determine that a received signal is from an OBSS when the received signal does not exceed a reference primary channel CCA threshold and the received primary channel signal exceeds a reference secondary channel CCA threshold.

4. The device of claim 1, wherein the processing circuit is further configured to:
    set a CCA energy-detection (CCA-ED) threshold to be a greater one of a level determined based on the OBSS_PD level and a reference CCA threshold associated with signals in the primary channel that are not decodable by the device, and
    determine whether the reception power level of the received primary channel signal exceeds the CCA-ED threshold regardless whether the received primary channel signal is decodable.

5. The device of claim 1, wherein
    the secondary channel CCA threshold is associated with signals in the secondary channel from outside the network service set that are decodable by the device, and
    the processing circuit is further configured to:
        determine whether the received secondary channel signal is from outside the network service set and decodable by the device, and
        determine whether the reception power level of the received secondary channel signal exceeds the secondary channel CCA threshold when the received secondary channel signal is determined to be from outside the network service set and decodable by the device.

6. The device of claim 5, wherein the processing circuit is further configured to:
    set a CCA energy-detection (CCA-ED) threshold to be a greater one of a level determined based on the OBSS_PD level and a reference CCA threshold associated with signals in the secondary channel that are not decodable by the device, and
    determine whether the reception power level of the received secondary channel signal exceeds the CCA-ED threshold regardless whether the received secondary channel signal is decodable.

7. The device of claim 1, wherein
the secondary CCA threshold is associated with signals in the secondary channel from outside the network service set, and
the processing circuit is further configured to:
   determine whether the reception power level of the received secondary channel signal exceeds the secondary channel CCA threshold when a received signal does not exceed a reference primary channel CCA threshold and the received signal exceeds a reference secondary channel CCA threshold.

8. A method for a device that operates within a network service set, the method comprising:
   storing a threshold associated with an overlapped basic service set (OBSS_PD level), the overlapped basic service set (OBSS) being configured to transmit signals outside the network service set that are decodable by the device;
   setting, by a processing circuit of the device, a secondary channel clear channel assessment (CCA) threshold to be a greater one of a default secondary channel CCA threshold and the OBSS_PD level
   determining whether a received primary channel signal from outside the network service set is decodable by the device,
   determining whether a reception power level of the received primary channel signal from outside the network service set exceeds the OBSS_PD level when the received primary channel signal is determined to be decodable by the device; and
   determining whether a reception power level of a received secondary channel signal exceeds the secondary channel CCA threshold.

9. The method of claim 8, further comprising:
   determining the secondary channel CCA threshold based on the OBSS_PD level in proportion to respective bandwidths of the primary and secondary channels.

10. The method of claim 8, further comprising:
    setting a CCA energy-detection (CCA-ED) threshold to be a greater one of a level determined based on the OBSS_PD level and a reference CCA threshold associated with signals in the primary channel that are not decodable by the device; and
    determining whether the reception power level of the received primary channel signal exceeds the CCA-ED threshold regardless whether the received primary channel signal is decodable.

11. The method of claim 8, wherein
the secondary channel CCA threshold is associated with signals in the secondary channel from outside the network service set that are decodable by the device, and
the method further comprises:
   determining whether the received secondary channel signal is from outside the network service set and decodable by the device, and
   determining whether the reception power level of the received secondary channel signal exceeds the secondary channel CCA threshold when the received secondary channel signal is determined to be from outside the network service set and decodable by the device.

12. The method of claim 11, further comprising:
    setting a CCA energy-detection (CCA-ED) threshold to be a greater one of a level determined based on the OBSS_PD level and a reference CCA threshold associated with signals in the secondary channel that are not decodable by the device; and
    determining whether the reception power level of the received secondary channel signal exceeds the CCA-ED threshold regardless whether the received secondary channel signal is decodable.

13. The method of claim 8, wherein
the secondary channel CCA threshold is associated with signals in the secondary channel from outside the network service set, and
the method further comprises:
   determining that a received signal is from an OBSS when the received signal does not exceed a reference primary channel CCA threshold and the received signal exceeds a reference secondary channel CCA threshold.

14. A non-transitory computer readable medium storing program instructions for causing a processing circuit of a device that operates within a network service set to perform a method, and the method comprising:
    storing a threshold level associated with an overlapped basic service set (OBSS_PD level), the overlapped basic service set (OBSS) being configured to transmit signals in a primary channel from outside the network service set that are decodable by the device;
    setting a secondary channel clear channel assessment (CCA) threshold to be a greater one of a default secondary channel CCA threshold and the OBSS_PD level;
    determining whether a received primary channel signal from outside the network service set is decodable by the device,
    determining whether a reception power level of the received primary channel signal from outside the network service set exceeds the OBSS_PD level when the received primary channel signal is determined to be decodable by the device; and
    determining whether a reception power level of a received secondary channel signal exceeds the secondary channel CCA threshold.

15. The non-transitory computer readable medium of claim 14, wherein the method further comprises:
    determining the secondary channel CCA threshold based on the OBSS_PD level in proportion to respective bandwidths of the primary and secondary channels.

16. The non-transitory computer readable medium of claim 14, wherein the method further comprises:
    setting a CCA energy-detection (CCA-ED) threshold to be a greater one of a level determined based on the OBSS_PD level and a reference CCA threshold associated with signals in the primary channel that are not decodable by the device; and
    determining whether a reception power level of a received primary channel signal exceeds the CCA-ED threshold regardless whether the received primary channel signal is decodable.

17. The non-transitory computer readable medium of claim 14, wherein
the secondary channel CCA threshold is associated with signals in the secondary channel from outside the network service set that are decodable by the device, and
the method further comprises:
   determining whether the received secondary channel signal is from outside the network service set and decodable by the device, and determining whether the reception power level of the received secondary channel signal exceeds the secondary channel CCA threshold when the received secondary channel signal is determined to be from outside the network service set and decodable by the device.

18. The non-transitory computer readable medium of claim 17, wherein the method further comprises setting a CCA energy-detection (CCA-ED) threshold to be a greater one of a level determined based on the OBSS_PD level and a reference CCA threshold associated with signals in the secondary channel that are not decodable by the device; and determining whether the reception power level of the received secondary channel signal exceeds the CCA-ED threshold regardless whether the received primary channel signal is decodable.

* * * * *